US012676525B2

(12) United States Patent
Yan et al.

(10) Patent No.: US 12,676,525 B2
(45) Date of Patent: Jul. 7, 2026

(54) METHOD FOR DOUBLE-LAYER WINDING LAYOUT APPLICABLE TO ASYMMETRICAL WINDING MACHINE

(71) Applicants: ZHEJIANG UNIVERSITY, Zhejiang (CN); ZHEJIANG UNIVERSITY ADVANCED ELECTRICAL EQUIPMENT INNOVATION CENTER, Zhejiang (CN)

(72) Inventors: Dong Yan, Zhejiang (CN); Haowei Lei, Zhejiang (CN); Peidong Hu, Zhejiang (CN); Zhen Zhang, Zhejiang (CN); Yan Yan, Zhejiang (CN); Wei Chen, Zhejiang (CN); Tingna Shi, Zhejiang (CN)

(73) Assignees: ZHEJIANG UNIVERSITY, Zhejiang (CN); ZHEJIANG UNIVERSITY ADVANCED ELECTRICAL EQUIPMENT INNOVATION CENTER, Zhejiang (CN)

( * ) Notice: Subject to any disclaimer, the term of this patent is extended or adjusted under 35 U.S.C. 154(b) by 185 days.

(21) Appl. No.: 18/733,809

(22) Filed: Jun. 4, 2024

(65) Prior Publication Data

US 2024/0333060 A1      Oct. 3, 2024

Related U.S. Application Data

(63) Continuation of application No. PCT/CN2023/100323, filed on Jun. 15, 2023.

(30) Foreign Application Priority Data

Mar. 13, 2023      (CN) .......................... 202310248762.2

(51) Int. Cl.
    H02K 3/28                (2006.01)

(52) U.S. Cl.
    CPC ........... *H02K 3/28* (2013.01); *H02K 2213/03* (2013.01)

(58) Field of Classification Search
    CPC .................................................... H02K 2213/03
                            (Continued)

(56)                References Cited

U.S. PATENT DOCUMENTS 3,515,922 A  *  6/1970  Fong ........................ H02K 3/28
                                                            310/198

FOREIGN PATENT DOCUMENTS

CN          201369654 Y  * 12/2009
CN          201369655 Y  * 12/2009
                            (Continued)

OTHER PUBLICATIONS

CN 105703555 A English Translation.*
                            (Continued)

*Primary Examiner* — Maged M Almawri
(74) *Attorney, Agent, or Firm* — JCIPRNET

(57)                ABSTRACT

The invention relates to a double-layer winding layout method suitable for asymmetrical winding machine. The method is implemented by three main steps: 1) the design of the initial double-layer winding layout structure for each machine unit, which is based on the principle of the largest number of spokes belonging to phase A; 2) rearranging the number of spokes in positive (e.g., labeled a-phase belt) and negative sectors (e.g., labeled x-phase belt) belonging to phase A for making slot numbers equally divided; 3) solving the serial number of the stator slot in reverse to get the final winding layout schemes which contain multiple layout structures for one slot-pole combination. The method of the present invention improves the conventional star-of-slot theory based on the distribution characteristics of the asym-
                            (Continued)

The first scheme metrical windings, perfects the general design theory of double-layer asymmetrical winding structure.

9 Claims, 4 Drawing Sheets

(58) Field of Classification Search
USPC ................................................... 310/178–208
See application file for complete search history.

(56) References Cited

FOREIGN PATENT DOCUMENTS

| | | | | | |
|---|---|---|---|---|---|
| CN | 104184240 | A | * | 12/2014 | |
| CN | 105703555 | | | 6/2016 | |
| CN | 105703555 | A | * | 6/2016 | ............... H02K 3/28 |
| CN | 105740584 | | | 7/2016 | |
| CN | 108880019 | A | * | 11/2018 | ............... H02K 3/28 |
| CN | 108988539 | | | 12/2018 | |
| CN | 110829664 | | | 2/2020 | |
| CN | 112199818 | | | 1/2021 | |
| CN | 117833575 | A | * | 4/2024 | ............... H02K 3/28 |
| GB | 644676 | | | 10/1950 | |
| SU | 924793 | A1 | * | 4/1982 | |

OTHER PUBLICATIONS

Alberti, Theory and Design of fractional slot multilayer windings.*
"International Search Report (Form PCT/ISA/210) of PCT/CN2023/100323," mailed on Nov. 15, 2023, pp. 1-3.
"Written Opinion of the International Searching Authority (Form PCT/ISA/237) of PCT/CN2023/100323," mailed on Nov. 15, 2023, pp. 1-3.

* cited by examiner

The first scheme

The second scheme

The third scheme

METHOD FOR DOUBLE-LAYER WINDING LAYOUT APPLICABLE TO ASYMMETRICAL WINDING MACHINE

CROSS-REFERENCE TO RELATED APPLICATION

This application is a continuation of international application of PCT application serial no. PCT/CN2023/100323 filed on Jun. 15, 2023, which claims the priority benefit of China application no. 202310248762.2 filed on Mar. 13, 2023. The entirety of each of the above mentioned patent applications is hereby incorporated by reference herein and made a part of this specification.

TECHNICAL FIELD

The invention relates to a double-layer winding layout method, specifically involving a double-layer winding layout method applicable to asymmetrical winding machine.

BACKGROUND TECHNIQUES

When the pole number is a multiple of six, considering the torque fluctuation period, winding factor, and winding half-turn length, the pole-slot matching schemes for this type of pole number are mostly in the form of asymmetrical winding. The excellent slot-pole combinations of the asymmetrical winding can make the machine performance comparable to that of symmetrical winding machines to a certain extent, as the torque ripple generated by asymmetry is much smaller than that generated by slot effect. To a certain extent, asymmetrical winding layout structure can provide permanent magnet synchronous machines with more selectable slot-pole combinations. At present, there are two main methods for the design of asymmetrical winding layouts. The first method is to arrange winding distribution in a certain cycle number order based on the slots per pole per phase. The second method is multi-set winding embedded method, which adopts 6 sets of three-phase winding for phase division and is mainly applied to 39-slot machine with 12-pole. Using the above research methods, a layout scheme for asymmetrical double-layer winding can be obtained. Due to the magnitudes and phases of the spokes located in the same spatial location of the star of slots are the same, there are multiple layout schemes for machine unit with one slot-pole combination. At present, there is no systematic method that can provide all asymmetrical double-layer winding layout schemes of various slot-pole combinations, which is not conducive to comprehensively comparing the advantages and disadvantages of each winding scheme, and it is difficult to construct a theoretical basis for slot-pole combinations selection of asymmetrical double-layer winding machines and determine the optimal winding layout structure.

INVENTION CONTENT

To address the issues presented in the background techniques, the present invention provides a double-layer winding layout method suitable for asymmetrical winding machines. Firstly, the initial winding layout structure for each machine unit is constructed, which is based on the principle of the largest number of spokes belonging to phase A and the resultant MMF vector of the other two-phase windings are symmetrical about the resultant MMF vector of phase A. Secondly, according to the parity of the number of spokes of phase A, the number of spokes in positive and negative sectors belonging to phase A is rearranged in order to complete the initial double-layer winding layout structure for secondary construction. Finally, according to the virtual slot number, the actual slot number can be inversely solved and the final double-layer winding layout schemes which contain multiple layout structures for one slot-pole combination based on the pitch of the asymmetrical winding machine.

The technical solution adopted by the present invention is as follows:

The method of the present invention is implemented by three main steps:

1) The design of the initial double-layer winding layout structure for each machine unit, which is based on the principle of the largest number of spokes belonging to phase A.

2) Rearranging the number of spokes in positive (e.g., labeled a-phase belt) and negative sectors (e.g., labeled x-phase belt) belonging to phase A for making slot numbers equally divided.

3) Solving the serial number of the stator slot in reverse to get the final winding layout schemes which contain multiple layout structures for one slot-pole combination.

In the initial double-layer winding layout structure depicted in the star of slots diagram for each machine unit of the asymmetrical winding machine as mentioned in step 1), the direction of the first spoke in the star of slots diagram for each machine unit (e.g., labeled 1) is set to point to the right horizontally and the other spokes (e.g., labeled 2, 3, . . . ) lag behind the first spoke successively by an angle $\theta_N$ in a clockwise direction, as detailed below:

$$\theta_N = (N-1)\frac{360v}{Q}$$

$$N = 1, 2, L, 3Q/v$$

where N is the virtual slot number of each spoke in the star of slots diagram; v is the greatest common divisor between slot number Q and pole pairs p.

In the asymmetrical winding machine, it specifically includes h machine units, where h=v/3, and there are three-layer slot vectors in the star of slots diagram for each machine unit, where the number of spokes in the one-layer star of slots diagram is q=Q/v; in the star of slots diagram for each machine unit of the asymmetrical winding machine, the back-EMFs induced in all the individual coils are the same and the angle between two spokes is $2\pi v/Q$. The star of slots diagram (including three-layer slot vectors) defined by the method of the present invention is different from the traditional star of slots diagram (including one-layer slot vectors).

In step 1), based on the principle of the largest number of spokes belonging to phase A, the initial double-layer winding layout structure depicted in the star of slots diagram for each machine unit of the asymmetrical winding machine is constructed. For each machine unit of the asymmetrical winding machine, the specific details are as follows:

1.1) The spokes in the star of slots diagram for each machine unit have equally displaced along the circumference, and the angle between two spokes is m=360v/Q.

1.2) Based on the design principle that the number of spokes belonging to phase A is largest and the resultant MMF vector of the other two-phase windings is symmetrical about the resultant MMF vector of phase A, all the J=3mod (Q/v, 3) spokes should be assigned to phase A, and meanwhile the spokes belonging to phase B and phase C of machine unit are symmetrically distributed in space with phase A axis as the central axis.

1.3) The number of spokes in the positive a-phase belt and negative x-phase belt belonging to phase A, the positive b-phase belt and negative y-phase belt belonging to phase B, and the positive c-phase belt and negative z-phase belt belonging to phase C should be divided equally as much as possible, and meanwhile it is necessary to ensure that the number of spokes in the positive sectors is no less than the number of spokes in the negative sectors, in order to complete the design of the initial double-layer asymmetrical winding layout structure.

In step 1.3), the number of spokes in the positive and negative sectors of phase A, phase B and phase C is written as $$\begin{cases} Q_a = 3\left\lceil \dfrac{Q/(3v) - J/9 + \mathrm{mod}(Q/v, 3)}{2} \right\rceil \\[2mm] Q_x = 3\left\lfloor \dfrac{Q/(3v) - J/9 + \mathrm{mod}(Q/v, 3)}{2} \right\rfloor \\[2mm] Q_b = Q_c = 3\left\lceil \dfrac{Q/(3v) - J/9}{2} \right\rceil \\[2mm] Q_y = Q_z = 3\left\lfloor \dfrac{Q/(3v) - J/9}{2} \right\rfloor \end{cases}$$

where $(Q_a, Q_x)$, $(Q_b, Q_y)$ and $(Q_c, Q_z)$ are the number of spokes in positive and negative sectors belonging to phase A, phase B and phase C, respectively.

If one or more of the number of spokes of phase A, phase B and phase C in machine unit cannot be evenly divided, the number of spokes in positive sectors should be greater in quantity than the number of spokes in the negative sectors, that is, the number of spokes $Q_a$ in positive a-phase belt is greater than or equal to the number of spokes $Q_x$ in negative x-phase belt, the number of spokes $Q_b$ in positive b-phase belt is greater than or equal to the number of spokes $Q_y$ in negative y-phase belt, and the number of spokes $Q_c$ in positive c-phase belt is greater than or equal to the number of spokes $Q_z$ in negative z-phase belt.

In step 2), based on the principle of evenly dividing the number of stator slot number, the number of spokes in positive (e.g., labeled a-phase belt) and negative sectors (e.g., labeled x-phase belt) belonging to phase A is rearranged. For each machine unit of the asymmetrical winding machine, the specific details are as follows:

In order to make stator slot number equally divided, only all the 2mod (Q/v, 3) spokes from phase A of machine unit should be assigned equally to phase B and phase C. Therefore, it is necessary to rearrange the number of spokes in positive and negative sectors belonging to phase A of machine unit. With the purpose of maximizing the back-EMF, the three spokes of a-phase belt (x-phase belt) closest to y-phase belt (b-phase belt) should be assigned to phase B, and the three spokes of a-phase belt (x-phase belt) closest to z-phase belt (c-phase belt) should be assigned to phase C; according to the parity of the number of spokes of phase A, the number of spokes in positive and negative sectors belonging to phase A is rearranged in order to complete the initial double-layer winding layout structure for secondary construction.

Since the magnitudes and phases of the spokes located in the same spatial location of the star of slots are the same, there are multiple layout schemes for machine unit with one slot-pole combination. According to the parity of the number of spokes of phase A, there exists seven categories for assigning the spokes in positive and negative sectors belonging to phase A.

According to the parity of the number of spokes of phase A, the number of spokes in positive and negative sectors belonging to phase A is rearranged. When the $k=(Q_a/3+Q_x/3)$ is even, the slot vectors belonging to a-phase belt and x-phase belt are collinear and their included angle is 180 degrees. The allocation procedures are as follows:

a) When $Q_a/3=1$ and $J/3=1$, the virtual slot number $N_{ax\_L1}$ of the spokes in the positive a-phase belt closest to negative y, z-phase belts and in the negative x-phase belt closest to positive b, c-phase belts can be deduced as $$N_{ax\_L1} = \begin{cases} 1 + \dfrac{(\lambda - 1)Q}{v} & \begin{pmatrix}\text{The positive } a-\text{phase}\\ \text{belt closest to negative}\\ y, z-\text{phase belts}\end{pmatrix} \\[4mm] \dfrac{Q_a}{3} + \dfrac{Q_z}{3} + \dfrac{Q_b}{3} + 1 + \dfrac{(\lambda - 1)Q}{v} & \begin{pmatrix}\text{The negative } x-\text{phase}\\ \text{belt closest to positive}\\ b, c-\text{phase belts}\end{pmatrix} \end{cases}$$

where the symbol $\lambda$ ($\lambda$=1, 2, 3) is the layer number of the star of slots for each machine unit.

In order to make stator slot number equally divided, it is necessary to take two spokes from the stator vectors whose the virtual slot number is $N_{ax\_L1}$ to assign equally to phase B and phase C. The allocation procedures are as follows:

a1) Assign any one spoke from phase A which the virtual slot number is $N_{ax\_L1}$ to b-phase belt or y-phase belt. Although the spatial location of each spoke which the serial number is $N_{ax\_L1}$ in actual winding structure is different, they can construct the same waveform distribution but different phases of MMF, thus there is $$C_3^1/3 = 1$$

winding layout scheme.

a2) Based on a1), assign any one spoke from the remaining spokes of phase A which the virtual slot number is $N_{ax\_L1}$ to c-phase belt or z-phase belt. According to a1), there are $$C_3^1/3 \times C_5^1 = 5$$

winding layout schemes in total in this case.

b) When $Q_a/3=1$ and $J/3\neq1$, the virtual slot number of the spokes in the positive a-phase belt closest to negative y, z-phase belts and in the negative x-phase belt closest to positive b, c-phase belts is same as a). In order to make stator slot number equally divided, it is necessary to take four spokes from the stator vectors whose the virtual slot number is $N_{ax\_L1}$ to assign equally to phase B and phase C. The allocation procedures are as follows:

b1) Assign any two spokes from phase A which the virtual slot number is $N_{ax\_L1}$ to b-phase belt or y-phase belt. There are $$C_6^2/3 = 5$$

winding layout schemes.

b2) Based on b1), assign any two spokes from the remaining spokes of phase A which the virtual slot number is $N_{ax\_L1}$ to c-phase belt or z-phase belt. According to b1), there are $$C_6^2/3 \times C_4^2 = 30$$

winding layout schemes in total in this case.

c) When $Q_d/3 \neq 1$ and $J/3=1$, the virtual slot number $N_{ax\_L2}$ of the spokes in the positive a-phase belt closest to negative y, z-phase belts, and the virtual slot number $N_{ax\_R2}$ of the spokes in the negative x-phase belt closest to positive b, c-phase belts can be deduced as $$
\begin{cases}
N_{ax\_L2} = \begin{cases} \dfrac{\lambda Q}{v} & \begin{pmatrix} \text{The positive } a\text{-phase} \\ \text{belt closest to negative} \\ y\text{-phase belts} \end{pmatrix} \\[2mm] \dfrac{Q_a}{3} + \dfrac{Q_z}{3} + \dfrac{Q_b}{3} + \dfrac{(\lambda-1)Q}{v} & \begin{pmatrix} \text{The negative } x\text{-phase} \\ \text{belt closest to positive} \\ b\text{-phase belts} \end{pmatrix} \end{cases} \\[8mm]
N_{ax\_R2} = \begin{cases} \dfrac{Q_a}{3} + \dfrac{(\lambda-1)Q}{v} - 1 & \begin{pmatrix} \text{The positive } a\text{-phase} \\ \text{belt closest to negative} \\ z\text{-phase belts} \end{pmatrix} \\[2mm] \dfrac{Q_a}{3} + \dfrac{Q_z}{3} + \dfrac{Q_b}{3} + \dfrac{Q_x}{3} + \dfrac{(\lambda-1)Q}{v} - 1 & \begin{pmatrix} \text{The negative } x\text{-phase} \\ \text{belt closest to positive} \\ c\text{-phase belts} \end{pmatrix} \end{cases}
\end{cases}
$$

In order to make stator slot number equally divided, it is necessary to take one spoke respectively from the stator vectors whose the virtual slot number is $N_{ax\_L2}$ and $N_{ax\_R2}$ to assign equally to phase B and phase C. The allocation procedures are as follows:

c1) Assign any one spoke from phase A which the virtual slot number is $N_{ax\_L2}$ to b-phase belt or y-phase belt. There are two winding layout schemes.

c2) Based on c1), assign any one spoke from phase A which the virtual slot number is $N_{ax\_R2}$ to z-phase belt or c-phase belt. According to c1), there are $$2 \times C_6^1 = 12$$

winding layout schemes in total in this case.

d) When $Q_d/3 \neq 1$ and $J/3 \neq 1$, the virtual slot number of the spokes in the positive a-phase belt closest to negative y, z-phase belts and in the negative x-phase belt closest to positive b, c-phase belts is same as c).

In order to make stator slot number equally divided, it is necessary to take two spokes respectively from the stator vectors whose the virtual slot number is $N_{ax\_L2}$ and $N_{ax\_R2}$ to assign equally to phase B and phase C. The allocation procedures are as follows:

d1) Assign any two spokes from phase A which the virtual slot number is $N_{ax\_L2}$ to b-phase belt or y-phase belt. There are $$C_6^2/3 = 5$$

winding layout schemes.

d2) Based on d1), assign any one spoke from phase A which the virtual slot number is $N_{ax\_R2}$ to z-phase belt or c-phase belt. According to d2), there are $$5 \times C_6^2 = 75$$

winding layout schemes in total in this case.

According to the parity of the number of spokes of phase A, the number of spokes in positive and negative sectors belonging to phase A is rearranged. When the $k=(Q_d/3+Q_x/3)$ is odd, the slot vectors belonging to a-phase belt and x-phase belt are arranged alternately, and the spokes in the positive a-phase belt are closest to negative y, z-phase belts. The allocation procedures are as follows:

e) When $Q_d/3=1$ and $J/3=1$, the virtual slot number $N_{ax\_L3}$ of the spokes in the positive a-phase belt closest to negative y, z-phase belts can be deduced as $$N_{ax\_L3} = 1 + \frac{(\lambda-1)Q}{v}$$

where the symbol $\lambda$ ($\lambda=1, 2, 3$) is the layer number of the star of slots for each machine unit;

In order to make stator slot number equally divided, it is necessary to take two spokes from the stator vectors whose the virtual slot number is $N_{ax\_L3}$ to assign equally to phase B and phase C.

The allocation procedures are as follows:

e1) Assign any one spoke from phase A which the virtual slot number is $N_{ax\_L3}$ to b-phase belt or y-phase belt. There is $$C_3^1/3 = 1$$

winding layout scheme.

e2) Based on e1), assign any one spoke from the remaining spokes of phase A which the virtual slot number is $N_{ax\_L3}$ to c-phase belt or z-phase belt. According to d2), there are $$C_3^1/3 \times C_2^1 = 2$$

winding layout schemes in total in this case.

f) When $Q_d/3 \neq 1$ and $J/3=1$, the virtual slot number $N_{ax\_L4}$ of the spokes in the positive a-phase belt closest to negative y-phase belts, and the virtual slot number $N_{ax\_R4}$ of the spokes in the positive a-phase belt closest to negative z-phase belts can be deduced as $$
\begin{cases}
N_{ax\_L4} = \dfrac{\lambda Q}{v} & \begin{pmatrix} \text{The positive } a\text{-phase belt closest} \\ \text{to negative } y\text{-phase belts} \end{pmatrix} \\[4mm]
N_{ax\_R4} = \dfrac{Q_a}{3} + \dfrac{(\lambda-1)Q}{v} - 1 & \begin{pmatrix} \text{The positive } a\text{-phase belt closest} \\ \text{to negative } z\text{-phase belts} \end{pmatrix}
\end{cases}
$$

In order to make stator slot number equally divided, it is necessary to take one spoke respectively from the stator vectors whose the virtual slot number is $N_{ax\_L4}$ and $N_{ax\_R4}$ to assign equally to phase B and phase C. The allocation procedures are as follows:

f1) Assign any one spoke from phase A which the virtual slot number is $N_{ax\_L4}$ to y-phase belt. There is $$C_3^1/3 = 1$$

winding layout scheme.

f2) Based on f1), assign any one spoke from phase A which the virtual slot number is $N_{ax\_R4}$ to z-phase belt. According to f2), there are $$C_3^1/3 \times C_3^1 = 3$$

winding layout schemes in total in this case.

g) When $Q_d/3 \neq 1$ and $J/3 \neq 1$, the virtual slot number of the spokes in the positive a-phase belt closest to negative y, z-phase belts is same as f);

In order to make stator slot number equally divided, it is necessary to take two spokes respectively from the stator vectors whose the virtual slot number is $N_{ax\_L4}$ and $N_{ax\_R4}$ to assign equally to phase B and phase C. The allocation procedures are as follows:

g1) Assign any two spokes from phase A which the virtual slot number is $N_{ax\_L4}$ to y-phase belt. There is $$C_3^2/3 = 1$$

winding layout scheme.

g2) Based on g1), assign any two spokes from phase A which the virtual slot number is $N_{ax\_R4}$ to z-phase belt. According to g2), there are $$C_3^2/3 \times C_3^2 = 3$$

winding layout schemes in total in this case.

Through rearranging the number of spokes in positive a-phase belt and negative x-phase belt belonging to phase A of machine unit, the stator slot number equally divided is realized.

The star of slots for machine unit is defined as the basic star plot and each machine unit has the same star of slots, and therefore the winding layouts of the other (h−1) machine units can directly replicate the winding layouts of the basic star plot. Based on the pitch of the asymmetrical winding machine and the basic star plot, the double-layer winding layout structure of the entire asymmetrical winding machine can be determined.

In step 3), in order to facilitate the winding embedding processing, according to the virtual slot number, the actual slot number can be inversely solved. For each machine unit of the asymmetrical winding machine, the specific details are as follows:

The defined virtual slot number is increased by one in a clockwise direction, which is different from the actual slot number, and the actual slot number can be inversely solved according to the virtual slot number, which can facilitate the winding embedding processing of asymmetric double-layer winding. According to the virtual slot number, the actual slot number can be inversely solved as $$Sl_N = \lfloor \text{Abs}[\text{Rem}(U_{1 \times p/h}, I_{1 \times p/h}) - I_{1 \times p/h}] \rfloor g U_{1 \times p/h}^T$$

where $S_{IN}$ is the actual slot number corresponding to the virtual slot number N of each spoke in the star of slots diagram of machine unit; p is the pole pairs; h is the number of the machine units; matrix $U_{1 \times p/h}$ is the solution to slot number from a pair of poles to p pairs of poles; $I_{1 \times p/h}$ is identity matrix.

For the solution to slot number from a pair of poles to p pairs of poles matrix $U_{1 \times p/h}$, the specific details are as follows:

$$U_{1 \times p/h} = \frac{(N - 1 + p/h)I_{1 \times p/h} + 3Q/v[0, 1, 2K, p/h - 1]}{p/h}$$

where N is the virtual slot number of each spoke in the star of slots diagram; v is the greatest common divisor between slot number Q and pole pairs p; h is the number of the machine units; $I_{1 \times p/h}$ is identity matrix.

The star of slots for machine unit is defined as the basic star plot and each machine unit has the same star of slots, and therefore the winding layouts of the other (h−1) machine units can directly replicate the winding layouts of the basic star plot. Furthermore, based on the pitch of the asymmetrical winding machine and the basic star plot, the double-layer winding layout structure of the entire asymmetrical winding machine can be determined.

The beneficial effects of the present invention are as follows:

The invention relates to a double-layer winding layout method suitable for asymmetrical winding machine. The proposed method of the present invention improves the conventional star-of-slot theory based on the distribution characteristics of the asymmetrical windings, perfects the general design theory of double-layer asymmetrical winding structure. Meanwhile, the method can provide all double-layer asymmetrical winding layout structures for various slot-pole combinations, which is conducive to comprehensively comparing the advantages and disadvantages of each winding scheme, constructing the theoretical basis for the selection of slot-pole combinations, and determining the optimal winding layout structure. To a certain extent, it can reduce the blindness of the design of the double-layer asymmetrical winding structure, and has strong generality and ease of implementation.

THE SPECIFIC IMPLEMENTATION WAYS

Figure 1:
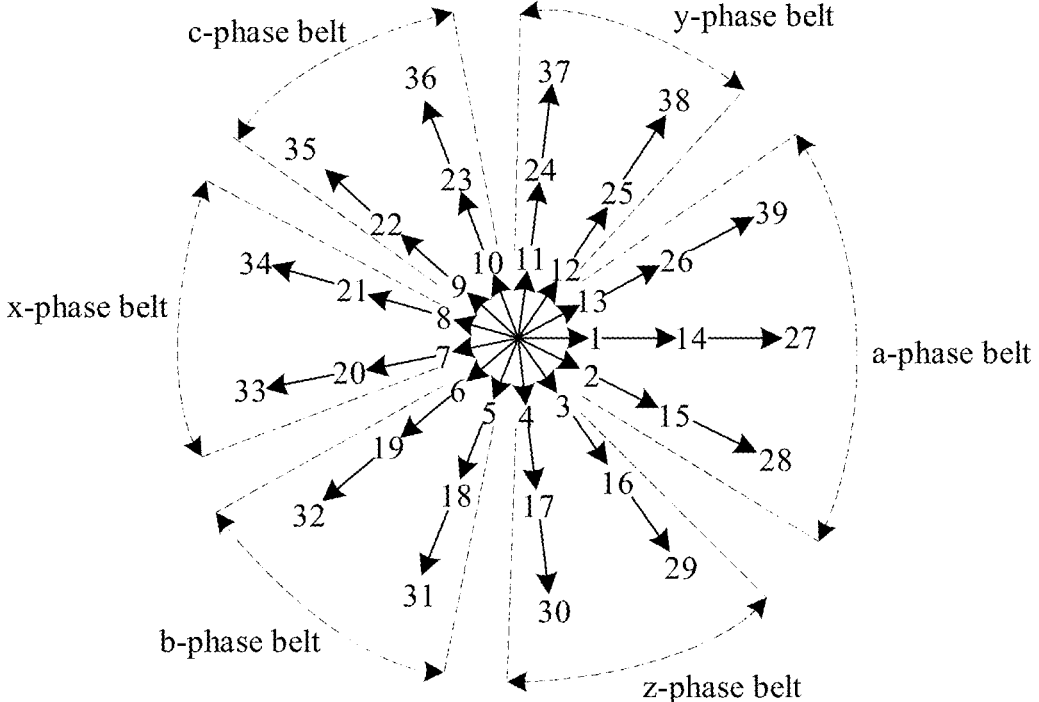
FIG. 1 shows the star of slots diagram of the initial winding layout scheme of 39-slot and 12-pole double-layer asymmetrical winding machine according to an embodiment of the present invention.

The following will provide a further detailed explanation of the present invention in conjunction with the accompanying drawings and specific embodiments.

The method of the present invention is implemented by the following steps:

1) Based on the principle of the largest number of spokes belonging to phase A, the initial double-layer winding layout structure depicted in the star of slots diagram for each machine unit of the asymmetrical winding machine is constructed.

In the initial double-layer winding layout structure depicted in the star of slots diagram for each machine unit of the asymmetrical winding machine as mentioned in step 1), the direction of the first spoke in the star of slots diagram for each machine unit (e.g., labeled 1) is set to point to the right horizontally and the other spokes (e.g., labeled 2, 3, . . . ) lag behind the first spoke successively by an angle $\theta_N$ in a clockwise direction, as detailed below:

$$\theta_N = (N - 1)\frac{360v}{Q}$$

$$N = 1, 2, L, 3Q/v$$

where N is the virtual slot number of each spoke in the star of slots diagram; v is the greatest common divisor between slot number Q and pole pairs p.

In the asymmetrical winding machine, it specifically includes h machine units, where h=v/3, and there are three-layer slot vectors in the star of slots diagram for each machine unit, where the number of spokes in the one-layer star of slots diagram is q=Q/v; in the star of slots diagram for each machine unit of the asymmetrical winding machine, the back-EMFs induced in all the individual coils are the same and the angle between two spokes is $2\pi v/Q$. The star of slots diagram (including three-layer slot vectors) defined by the method of the present invention is different from the traditional star of slots diagram (including one-layer slot vectors).

In step 1), based on the principle of the largest number of spokes belonging to phase A, the initial double-layer winding layout structure depicted in the star of slots diagram for each machine unit of the asymmetrical winding machine is constructed. For each machine unit of the asymmetrical winding machine, the specific details are as follows:

1.1) The spokes in the star of slots diagram for each machine unit have equally displaced along the circumference, and the angle between two spokes is m=360v/Q.

1.2) Based on the design principle that the number of spokes belonging to phase A is largest and the resultant MMF vector of the other two-phase windings is symmetrical about the resultant MMF vector of phase A, all the J=3mod (Q/v, 3) spokes should be assigned to phase A, and meanwhile the spokes belonging to phase B and phase C of machine unit are symmetrically distributed in space with phase A axis as the central axis.

1.3) The number of spokes in the positive a-phase belt and negative x-phase belt belonging to phase A, the positive b-phase belt and negative y-phase belt belonging to phase B, and the positive c-phase belt and negative z-phase belt belonging to phase C should be divided equally as much as possible, and meanwhile it is necessary to ensure that the number of spokes in the positive sectors is no less than the number of spokes in the negative sectors, in order to complete the design of the initial double-layer asymmetrical winding layout structure.

In step 1.3), the number of spokes in the positive and negative sectors of phase A, phase B and phase C is written as $$\begin{cases} Q_a = 3\left\lceil \dfrac{Q/(3v) - J/9 + \mod(Q/v,\ 3)}{2} \right\rceil \\ Q_x = 3\left\lfloor \dfrac{Q/(3v) - J/9 + \mod(Q/v,\ 3)}{2} \right\rfloor \\ Q_b = Q_c = 3\left\lceil \dfrac{Q/(3v) - J/9}{2} \right\rceil \\ Q_y = Q_z = 3\left\lfloor \dfrac{Q/(3v) - J/9}{2} \right\rfloor \end{cases}$$

where ($Q_a$, $Q_x$), ($Q_b$, $Q_y$) and ($Q_c$, $Q_z$) are the number of spokes in positive and negative sectors belonging to phase A, phase B and phase C, respectively.

If one or more of the number of spokes of phase A, phase B and phase C in machine unit cannot be evenly divided, the number of spokes in positive sectors should be greater in quantity than the number of spokes in the negative sectors, that is, the number of spokes $Q_a$ in positive a-phase belt is greater than or equal to the number of spokes $Q_x$ in negative x-phase belt, the number of spokes $Q_b$ in positive b-phase belt is greater than or equal to the number of spokes $Q_y$ in negative y-phase belt, and the number of spokes $Q_c$ in positive c-phase belt is greater than or equal to the number of spokes $Q_z$ in negative z-phase belt.

2) Based on the principle of evenly dividing the number of stator slot number, the number of spokes in positive (e.g., labeled a-phase belt) and negative sectors (e.g., labeled x-phase belt) belonging to phase A is rearranged.

In step 2), based on the principle of evenly dividing the number of stator slot number, the number of spokes in positive (e.g., labeled a-phase belt) and negative sectors (e.g., labeled x-phase belt) belonging to phase A is rearranged. For each machine unit of the asymmetrical winding machine, the specific details are as follows:

In order to make stator slot number equally divided, only all the 2mod (Q/v, 3) spokes from phase A of machine unit should be assigned equally to phase B and phase C. Therefore, it is necessary to rearrange the number of spokes in positive and negative sectors belonging to phase A of machine unit. With the purpose of maximizing the back-EMF, the three spokes of a-phase belt (x-phase belt) closest to y-phase belt (b-phase belt) should be assigned to phase B, and the three spokes of a-phase belt (x-phase belt) closest to z-phase belt (c-phase belt) should be assigned to phase C; according to the parity of the number of spokes of phase A, the number of spokes in positive and negative sectors belonging to phase A is rearranged in order to complete the initial double-layer winding layout structure for secondary construction.

Since the magnitudes and phases of the spokes located in the same spatial location of the star of slots are the same, there are multiple layout schemes for machine unit with one slot-pole combination. According to the parity of the number of spokes of phase A, there exists seven categories for assigning the spokes in positive and negative sectors belonging to phase A.

According to the parity of the number of spokes of phase A, the number of spokes in positive and negative sectors belonging to phase A is rearranged. When the $k=(Q_d/3+Q_x/3)$ is even, the slot vectors belonging to a-phase belt and x-phase belt are collinear and their included angle is 180 degrees. The allocation procedures are as follows:

a) When $Q_d/3=1$ and $J/3=1$, the virtual slot number $N_{ax\_L1}$ of the spokes in the positive a-phase belt closest to negative y, z-phase belts and in the negative x-phase belt closest to positive b, c-phase belts can be deduced as $$N_{ax\_L1} = \begin{cases} 1 + \dfrac{(\lambda-1)Q}{v} & \text{(The positive } a\text{-phase belt closest} \\ & \text{to negative } y, z\text{-phase belts)} \\ \dfrac{Q_a}{3} + \dfrac{Q_z}{3} + & \text{(The negative } x\text{-phase belt} \\ \dfrac{Q_b}{3} + 1 + \dfrac{(\lambda-1)Q}{v} & \text{closest to positive } b,c\text{-phase belts)} \end{cases}$$

where the symbol $\lambda$ ($\lambda=1, 2, 3$) is the layer number of the star of slots for each machine unit.

In order to make stator slot number equally divided, it is necessary to take two spokes from the stator vectors whose the virtual slot number is $N_{ax\_L1}$ to assign equally to phase B and phase C. The allocation procedures are as follows:

a1) Assign any one spoke from phase A which the virtual slot number is $N_{ax\_L1}$ to b-phase belt or y-phase belt. Although the spatial location of each spoke which the serial number is $N_{ax\_L1}$ in actual winding structure is different, they can construct the same waveform distribution but different phases of MMF, thus there is $$C_3^1/3 = 1$$

winding layout scheme.

a2) Based on a1), assign any one spoke from the remaining spokes of phase A which the virtual slot number is $N_{ax\_L1}$ to c-phase belt or z-phase belt. According to a1), there are $$C_3^1/3 \times C_5^1 = 5$$

winding layout schemes in total in this case.

b) When $Q_d/3=1$ and $J/3\neq1$, the virtual slot number of the spokes in the positive a-phase belt closest to negative y, z-phase belts and in the negative x-phase belt closest to positive b, c-phase belts is same as a). In order to make stator slot number equally divided, it is necessary to take four spokes from the stator vectors whose the virtual slot number is $N_{ax\_L1}$ to assign equally to phase B and phase C. The allocation procedures are as follows:

b1) Assign any two spokes from phase A which the virtual slot number is $N_{ax\_L1}$ to b-phase belt or y-phase belt. There are $$C_6^2/3 = 5$$

winding layout schemes.

b2) Based on b1), assign any two spokes from the remaining spokes of phase A which the virtual slot number is $N_{ax\_L1}$ to c-phase belt or z-phase belt. According to b1), there are $$C_6^2/3 \times C_4^2 = 30$$

winding layout schemes in total in this case.

c) When $Q_d/3\neq1$ and $J/3=1$, the virtual slot number $N_{ax\_L2}$ of the spokes in the positive a-phase belt closest to negative y, z-phase belts, and the virtual slot number $N_{ax\_R2}$ of the spokes in the negative x-phase belt closest to positive b, c-phase belts can be deduced as $$\begin{cases} N_{ax\_L2} = \begin{cases} \dfrac{\lambda Q}{v} & \text{(The positive } a\text{-phase belt closest} \\ & \text{to negative } y\text{-phase belts)} \\ \dfrac{Q_a}{3} + \dfrac{Q_z}{3} + & \text{(The negative } x\text{-phase belt} \\ \dfrac{Q_b}{3} + \dfrac{(\lambda-1)Q}{v} & \text{closest to positive } b\text{-phase belts)} \end{cases} \\ N_{ax\_R2} = \begin{cases} \dfrac{Q_a}{3} + \dfrac{(\lambda-1)Q}{v} - 1 & \begin{array}{l}\text{(The positive } a\text{-phase belt} \\ \text{closest to negative} \\ z\text{-phase belts)}\end{array} \\ \dfrac{Q_a}{3} + \dfrac{Q_z}{3} + & \begin{array}{l}\text{(The negative } x\text{-phase belt} \\ \text{closest to positive}\end{array} \\ \dfrac{Q_b}{3} + \dfrac{Q_x}{3} + \dfrac{(\lambda-1)Q}{v} - 1 & c\text{-phase belts)} \end{cases} \end{cases}$$

In order to make stator slot number equally divided, it is necessary to take one spoke respectively from the stator vectors whose the virtual slot number is $N_{ax\_L2}$ and $N_{ax\_R2}$ to assign equally to phase B and phase C. The allocation procedures are as follows:

c1) Assign any one spoke from phase A which the virtual slot number is $N_{ax\_L2}$ to b-phase belt or y-phase belt. There are two winding layout schemes.

c2) Based on c1), assign any one spoke from phase A which the virtual slot number is $N_{ax\_R2}$ to z-phase belt or c-phase belt. According to c1), there are $$2 \times C_6^1 = 12$$

winding layout schemes in total in this case.

d) When $Q_d/3\neq1$ and $J/3\neq1$, the virtual slot number of the spokes in the positive a-phase belt closest to negative y, z-phase belts and in the negative x-phase belt closest to positive b, c-phase belts is same as c).

In order to make stator slot number equally divided, it is necessary to take two spokes respectively from the stator vectors whose the virtual slot number is $N_{ax\_L2}$ and $N_{ax\_R2}$ to assign equally to phase B and phase C. The allocation procedures are as follows:

d1) Assign any two spokes from phase A which the virtual slot number is $N_{ax\_L2}$ to b-phase belt or y-phase belt. There are $$C_6^2/3 = 5$$

winding layout schemes.

d2) Based on d1), assign any one spoke from phase A which the virtual slot number is $N_{ax\_R2}$ to z-phase belt or c-phase belt. According to d2), there are $$5 \times C_6^2 = 75$$

winding layout schemes in total in this case.

According to the parity of the number of spokes of phase A, the number of spokes in positive and negative sectors belonging to phase A is rearranged. When the $k=(Q_d/3+Q_x/3)$ is odd, the slot vectors belonging to a-phase belt and x-phase belt are arranged alternately, and the spokes in the positive a-phase belt are closest to negative y, z-phase belts. The allocation procedures are as follows:

e) When $Q_d/3=1$ and $J/3=1$, the virtual slot number $N_{ax\_L3}$ of the spokes in the positive a-phase belt closest to negative y, z-phase belts can be deduced as $$N_{ax\_L3} = 1 + \frac{(\lambda - 1)Q}{v}$$

where the symbol $\lambda$ ($\lambda=1, 2, 3$) is the layer number of the star of slots for each machine unit;

In order to make stator slot number equally divided, it is necessary to take two spokes from the stator vectors whose the virtual slot number is $N_{ax\_L3}$ to assign equally to phase B and phase C. The allocation procedures are as follows:

e1) Assign any one spoke from phase A which the virtual slot number is $N_{ax\_L3}$ to b-phase belt or y-phase belt. There is $$C_3^1/3 = 1$$

winding layout scheme.

e2) Based on e1), assign any one spoke from the remaining spokes of phase A which the virtual slot number is $N_{ax\_L3}$ to c-phase belt or z-phase belt. According to d2), there are $$C_3^1/3 \times C_2^1 = 2$$

winding layout schemes in total in this case.

f) When $Q_d/3 \neq 1$ and $J/3=1$, the virtual slot number $N_{ax\_L4}$ of the spokes in the positive a-phase belt closest to negative y-phase belts, and the virtual slot number $N_{ax\_R4}$ of the spokes in the positive a-phase belt closest to negative z-phase belts can be deduced as $$
\begin{cases}
N_{ax\_L4} = \dfrac{\lambda Q}{v} & \text{(The positive } a\text{-phase belt} \\
& \text{closest to negative } y\text{-phase belts)} \\
N_{ax\_R4} = \dfrac{Q_a}{3} + & \text{(The positive } a\text{-phase belt} \\
\dfrac{(\lambda - 1)Q}{v} - 1 & \text{closest to negative } z\text{-phase belts)}
\end{cases}
$$

In order to make stator slot number equally divided, it is necessary to take one spoke respectively from the stator vectors whose the virtual slot number is $N_{ax\_L4}$ and $N_{ax\_R4}$ to assign equally to phase B and phase C. The allocation procedures are as follows:

f1) Assign any one spoke from phase A which the virtual slot number is $N_{ax\_L4}$ to y-phase belt. There is $$C_3^1/3 = 1$$

winding layout scheme.

f2) Based on f1), assign any one spoke from phase A which the virtual slot number is $N_{ax\_R4}$ to z-phase belt. According to f2), there are $$C_3^1/3 \times C_3^1 = 3$$

winding layout schemes in total in this case.

g) When $Q_d/3 \neq 1$ and $J/3 \neq 1$, the virtual slot number of the spokes in the positive a-phase belt closest to negative y, z-phase belts is same as f);

In order to make stator slot number equally divided, it is necessary to take two spokes respectively from the stator vectors whose the virtual slot number is $N_{ax\_L4}$ and $N_{ax\_R4}$ to assign equally to phase B and phase C. The allocation procedures are as follows:

g1) Assign any two spokes from phase A which the virtual slot number is $N_{ax\_L4}$ to y-phase belt. There is $$C_3^2/3 = 1$$

winding layout scheme.

g2) Based on g1), assign any two spokes from phase A which the virtual slot number is $N_{ax\_R4}$ to z-phase belt. According to g2), there are $$C_3^2/3 \times C_3^2 = 3$$

winding layout schemes in total in this case.

Through rearranging the number of spokes in positive a-phase belt and negative x-phase belt belonging to phase A of machine unit, the stator slot number equally divided is realized.

The star of slots for machine unit is defined as the basic star plot and each machine unit has the same star of slots, and therefore the winding layouts of the other (h−1) machine units can directly replicate the winding layouts of the basic star plot. Based on the pitch of the asymmetrical winding machine and the basic star plot, the double-layer winding layout structure of the entire asymmetrical winding machine can be determined.

3) Based on the virtual slot number in the star of slots diagram, the actual slot number can be inversely solved, achieving the double-layer winding layout of the asymmetrical winding machine.

In step 3), in order to facilitate the winding embedding processing, according to the virtual slot number, the actual slot number can be inversely solved. For each machine unit of the asymmetrical winding machine, the specific details are as follows:

The defined virtual slot number is increased by one in a clockwise direction, which is different from the actual slot number, and the actual slot number can be inversely solved according to the virtual slot number, which can facilitate the winding embedding processing of asymmetric double-layer winding. According to the virtual slot number, the actual slot number can be inversely solved as $$Sl_N = \lfloor \text{Abs}[Rem(U_{1 \times p/h}, I_{1 \times p/h}) - I_{1 \times p/h}] \rfloor g U_{1 \times p/h}^T$$

where $S_{IN}$ is the actual slot number corresponding to the virtual slot number N of each spoke in the star of slots diagram of machine unit; p is the pole pairs; h is the number of the machine units; matrix $U_{1 \times p/h}$ is the solution to slot number from a pair of poles to p pairs of poles; $I_{1 \times p/h}$ is identity matrix.

For the solution to slot number from a pair of poles to p pairs of poles matrix $U_{1 \times p/h}$, the specific details are as follows:

$$U_{1 \times p/h} = \frac{(N - 1 + p/h)I_{1 \times p/h} + 3Q/v[0,1,2 \text{ K}, p/h - 1]}{p/h}$$

where N is the virtual slot number of each spoke in the star of slots diagram; v is the greatest common divisor between slot number Q and pole pairs p; h is the number of the machine units; $I_{1 \times p/h}$ is identity matrix.

The star of slots for machine unit is defined as the basic star plot and each machine unit has the same star of slots, and therefore the winding layouts of the other (h−1) machine units can directly replicate the winding layouts of the basic star plot. Furthermore, based on the pitch of the asymmetrical winding machine and the basic star plot, the double-layer winding layout structure of the entire asymmetrical winding machine can be determined.

The specific implementation process of the present invention is as follows:

In the method of the present invention, it is mainly through dividing equally the redundant spokes belonging to phase A to phase B and phase C, so as to make all the winding layouts as symmetric as possible and guarantee to have high winding factors.

This specific implementation example takes the layout structure design of 39-slot and 12-pole asymmetrical double-layer winding as an example, as follows:

Step 1: The initial double-layer asymmetrical winding layout structure for each machine unit is constructed, which is based on the principle of the largest number of spokes belonging to phase A. The greatest common divisor (GCD) between slot number Q and pole pairs p of the 39-slot and 12-pole double-layer asymmetrical winding machine can be presented as GCD (Q, p)=3, and it specifically includes h=1 machine unit, which there are three-layer slot vectors in the star of slots diagram for each machine unit, and the number of spokes in the one-layer star of slots diagram is q=Q/v=13. In order to obtain the asymmetrical winding layouts as symmetric as possible and guarantee to have high winding factors, the rules have to be carried out for allocating the number of spokes of the 39-slot and 12-pole double-layer asymmetrical winding machine in positive a-phase belt, positive b-phase belt, c-phase belt, and in negative x-phase belt, negative y-phase belt, negative z-phase belt, so the specific details are as follows:

The spokes in the star of slots diagram for each machine unit have equally displaced along the circumference, and the angle between two spokes is m=360/13. Based on the design principle that the number of spokes belonging to phase A is largest and the resultant MMF vector of the other two-phase windings is symmetrical about the resultant MMF vector of phase A, all the J=3mod (13, 3)=3 spokes should be assigned to phase A, and meanwhile the spokes belonging to phase B and phase C of machine unit are symmetrically distributed in space with phase A axis as the central axis. The number of spokes in the positive a-phase belt and negative x-phase belt belonging to phase A, the positive b-phase belt and negative y-phase belt belonging to phase B, and the positive c-phase belt and negative z-phase belt belonging to phase C should be divided equally as much as possible, and meanwhile it is necessary to ensure that the number of spokes in the positive sectors is no less than the number of spokes in the negative sectors, thus the number of spokes in the positive and negative sectors of phase A, phase B and phase C satisfies $Q_a$=9, $Q_b$=6, $Q_c$=6, $Q_x$=6, $Q_y$=6 and $Q_z$=6.

FIG. 1 shows the star of slots diagram of the initial winding layout scheme of 39-slot and 12-pole double-layer asymmetrical winding machine. As can be seen from FIG. 1, it can be analyzed that the number of spokes belonging to phase A is the largest, the number of spokes belonging to phase B and phase C of machine unit are the same and symmetrically distributed in space with phase A axis as the central axis, with $Q_a > Q_x$, $Q_b = Q_y$, and $Q_c = Q_z$. Meanwhile, it can be also analyzed that only two spokes from phase A of machine unit should be assigned equally to phase B and phase C for making slot numbers equally divided.

Step 2: The number of spokes in positive (e.g., labeled a-phase belt) and negative sectors (e.g., labeled x-phase belt) belonging to phase A is rearranged. For the 39-slot and 12-pole double-layer asymmetrical winding machine, satisfying k=$Q_a$/3+$Q_x$/3 as an odd number, $Q_a$/3≠1, and J/3=1, the virtual slot number of the spokes in the positive a-phase belt closest to negative y-phase belt is 13, 26, 39; the virtual slot number of the spokes in the positive a-phase belt closest to negative z-phase belt is 2, 15, 28. In order to make stator slot number equally divided, it is necessary to assign any one spoke from phase A which the virtual slot number is 13, 26, 39 to phase B, and the virtual slot number is 2, 15, 28 to phase B. The allocation procedures are as follows:

1. Assign any one spoke from phase A which the virtual slot number is 13, 26, 39 to y-phase belt. There is $$C_3^2/3 = 1$$

winding layout scheme.

2. Assign any one spoke from phase A which the virtual slot number is 2, 15, 28 to z-phase belt. According to 1, there are $$C_3^2/3 \times C_3^2 = 3$$

winding layout schemes in total in this case.

Figure 2A:
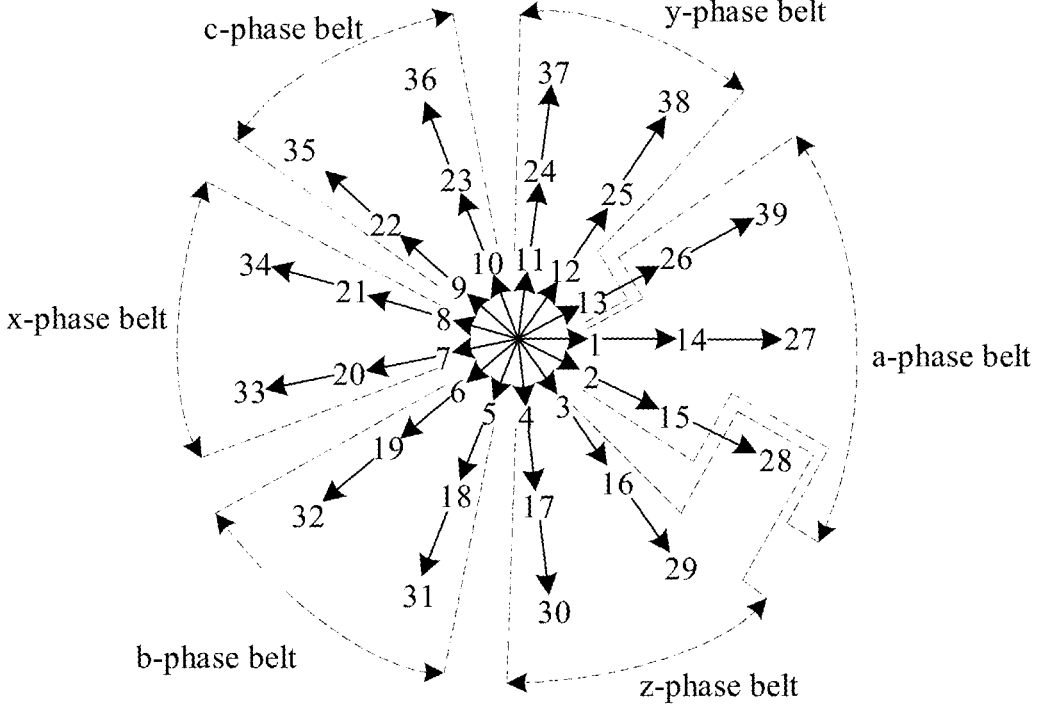
FIG. 2A shows the first winding layout scheme for 39-slot and 12-pole double-layer asymmetrical winding machine in an embodiment of the present invention after rearranging the number of spokes in positive (e.g., labeled a-phase belt) and negative sectors (e.g., labeled x-phase belt) belonging to phase A.
Figure 2B:
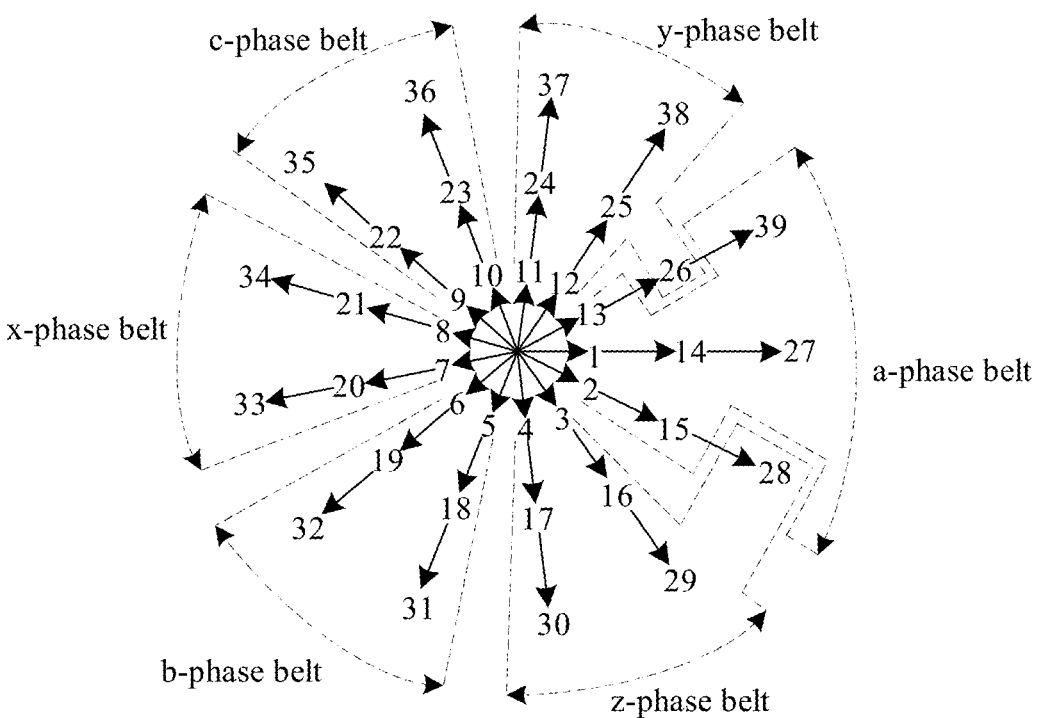
FIG. 2B shows the second winding layout scheme for 39-slot and 12-pole double-layer asymmetrical winding machine in an embodiment of the present invention after rearranging the number of spokes in positive (e.g., labeled a-phase belt) and negative sectors (e.g., labeled x-phase belt) belonging to phase A.
Figure 2C:
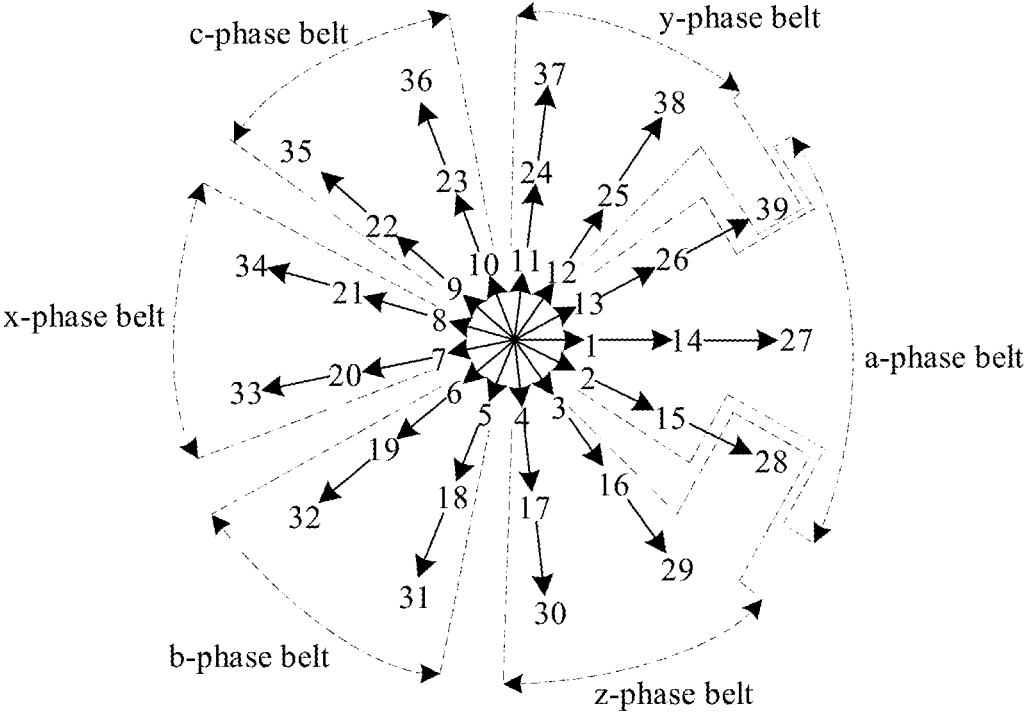
FIG. 2C shows the third winding layout scheme for 39-slot and 12-pole double-layer asymmetrical winding machine in an embodiment of the present invention after rearranging the number of spokes in positive (e.g., labeled a-phase belt) and negative sectors (e.g., labeled x-phase belt) belonging to phase A.

FIGS. 2A-2C shows the three winding layout schemes for 39-slot and 12-pole double-layer asymmetrical winding machine in an embodiment of the present invention after rearranging the number of spokes in positive (e.g., labeled a-phase belt) and negative sectors (e.g., labeled x-phase belt) belonging to phase A.

Step 3: According to the virtual slot number, the actual slot number can be inversely solved and the final double-layer winding layout schemes which contain multiple layout structures for one slot-pole combination.

In order to facilitate the winding embedding processing, according to the virtual slot number, the actual slot number can be inversely solved.

The direction of the first spoke in the star of slots diagram for each machine unit of 39-slot and 12-pole double-layer asymmetrical winding machine (e.g., labeled 1) is set to point to the right horizontally and the other spokes (e.g., labeled 2, 3, . . . ) lag behind the first spoke successively by an angle $\theta_N$ in a clockwise direction. Table 1 shows the virtual slot number and their corresponding actual slot number for the three winding layout schemes in FIGS. 2A-2C.

To improve the back-EMF of the 39-slot and 12-pole asymmetrical double-layer winding machine, the pitch is selected as 3.

Figure 3A:
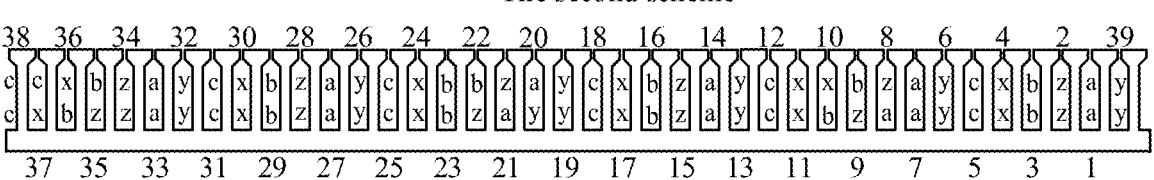
FIG. 3A shows the first double-layer winding layout scheme after reversing the virtual slot number for a 39-slot 12-pole asymmetrical double-layer winding machine in an embodiment of the present invention.
Figure 3B:
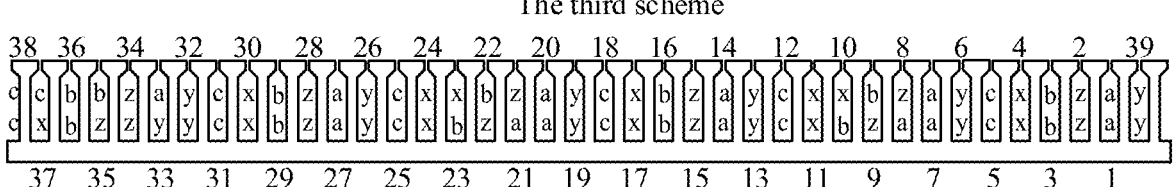
FIG. 3B shows the second double-layer winding layout scheme after reversing the virtual slot number for a 39-slot 12-pole asymmetrical double-layer winding machine in an embodiment of the present invention.
Figure 3C:
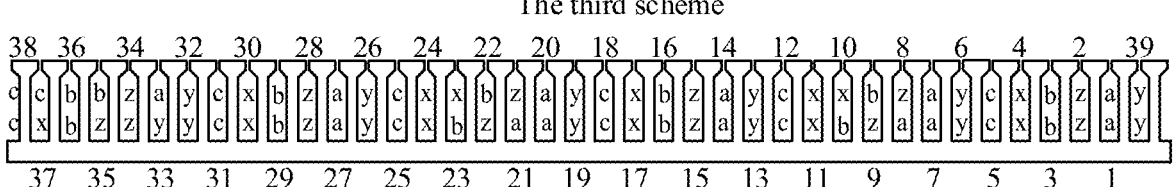
FIG. 3C shows the third double-layer winding layout scheme after reversing the virtual slot number for a 39-slot 12-pole asymmetrical double-layer winding machine in an embodiment of the present invention.

At the same time, the number of the machine unit h=1 for the 39-slot and 12-pole asymmetrical double-layer winding machine, and thus the winding layout schemes of the machine unit is the winding layout schemes of the 39-slot and 12-pole asymmetrical double-layer winding machine. The three winding layout schemes for the 39-slot and 12-pole asymmetrical double-layer winding machine are shown in FIGS. 3A-3C.

invention is not limited to the above embodiments, and improvements and modifications made by those skilled in the art based on the disclosure of the present invention should be within the scope of the present invention.

What is claimed is:

1. A method for double-layer winding layout applicable to an asymmetrical winding machine, wherein the method comprises the following steps:

1) designing an initial double-layer winding layout structure for each machine unit of the asymmetrical winding machine, which is based on a principle of a largest number of spokes belonging to phase A;

2) rearranging a number of spokes in a positive sector labeled as an a-phase belt and a negative sector labeled as an x-phase belt belonging to phase A for making slot numbers equally divided;

3) Solving a serial number of a stator slot in reverse to get final winding layout schemes which contain multiple layout structures for one slot-pole combination, wherein in the initial double-layer winding layout structure depicted in a star of slots diagram for each machine unit of the asymmetrical winding machine, a direction of a first spoke in the star of slots diagram for each machine unit labeled 1 is set to point to the right horizontally and the other spokes lag behind the first spoke successively by an angle $\theta_N$ in a clockwise direction, as detailed below:

$$\theta_N = (N - 1)\frac{360v}{Q}$$

$$N = 1, 2, L, 3Q/v$$

where N is a virtual slot number of each spoke in the star of slots diagram; vis a greatest common divisor between a slot number O and pole pairs p;

wherein the asymmetrical winding machine specifically includes h machine units,

TABLE 1

| One-layer | Virtual Number | 1 | 2 | 3 | 4 | 5 | 6 | 7 | 8 | 9 | 10 | 11 | 12 | 13 |
|---|---|---|---|---|---|---|---|---|---|---|---|---|---|---|
| | Actual Number | 1 | 8 | 2 | 9 | 3 | 10 | 4 | 11 | 5 | 12 | 6 | 13 | 7 |
| Two-layer | Virtual Number | 14 | 15 | 16 | 17 | 18 | 19 | 20 | 21 | 22 | 23 | 24 | 25 | 26 |
| | Actual Number | 14 | 21 | 15 | 22 | 16 | 23 | 17 | 24 | 18 | 25 | 19 | 26 | 20 |
| Three-layer | Virtual Number | 27 | 28 | 29 | 30 | 31 | 32 | 33 | 34 | 35 | 36 | 37 | 38 | 39 |
| | Actual Number | 27 | 34 | 28 | 35 | 29 | 36 | 30 | 37 | 31 | 38 | 32 | 39 | 33 |

Finally, according to the virtual slot number, the actual slot number can be inversely solved and the final winding layout schemes which contain multiple layout structures for one slot-pole combination can be determined.

The description of the above embodiments is provided to facilitate understanding and application of the present invention by ordinary skilled artisans in this technical field. Those familiar with the technical field can readily make various modifications to the above embodiments and apply the general principles described herein to other embodiments without requiring inventive effort. Therefore, the present where h=v/3, and there are three-layer slot vectors in the star of slots diagram for each machine unit, where a number of spokes in a one-layer star of slots diagram is q=O/v.

2. The method for double-layer winding layout of claim 1, wherein the method further comprises the following steps: the star of slots for machine unit is defined as the basic star plot and each machine unit has the same star of slots, and therefore the winding layouts of the other (h−1) machine units can directly replicate the winding layouts of the basic star plot, wherein based on the pitch of the asymmetrical winding machine and the basic star plot, the double-layer winding layout structure of the entire asymmetrical winding machine can be determined.

3. The method for double-layer winding layout of claim 1, wherein the method further comprises the following steps: in step 3, in order to facilitate the winding embedding processing, according to the virtual slot number, the actual slot number can be inversely solved, wherein for each machine unit of the asymmetrical winding machine, the specific details are as follows:

$$Sl_N = \left\lfloor \text{Abs}\left[\text{Rem}\left(U_{1\times p/h}, I_{1\times p/h}\right) - I_{1\times p/h}\right]\right\rfloor g U_{1\times p/h}^T$$

where $S_{IN}$ is the actual slot number corresponding to the virtual slot number N of each spoke in the star of slots diagram of machine unit; p is the pole pairs; h is the number of the machine units; matrix $U_{1\times p/h}$ is the solution to slot number from a pair of poles to p pairs of poles; $I_{1\times p/h}$ is identity matrix.

4. The method for double-layer winding layout of claim 3, wherein the method further comprises the following steps: for the solution to slot number from a pair of poles to p pairs of poles matrix $U_{1\times p/h}$, the specific details are as follows:

$$U_{1\times p/h} = \frac{(N - 1 + p/h)I_{1\times p/h} + 3Q/v[0,1,2\ \text{K},\ p/h - 1]}{p/h}$$

where N is the virtual slot number of each spoke in the star of slots diagram; v is the greatest common divisor between slot number Q and pole pairs p; h is the number of the machine units; $I_{1\times p/h}$ is identity matrix.

5. The method for double-layer winding layout of claim 1, wherein the method further comprises the following steps: in step 1, based on the principle of the largest number of spokes belonging to phase A, the initial double-layer winding layout structure depicted in the star of slots diagram for each machine unit of the asymmetrical winding machine is constructed, wherein for each machine unit of the asymmetrical winding machine, the specific details are as follows:

1.1) the spokes in the star of slots diagram for each machine unit have equally displaced along the circumference, and the angle between two spokes is m=360v/Q;

1.2) based on the design principle that the number of spokes belonging to phase A is largest and the resultant MMF vector of the other two-phase windings is symmetrical about the resultant MMF vector of phase A, all of the J=3mod (Q/v, 3) spokes should be assigned to phase A, where J represents a number of additional spokes assigned to phase A and mod represents a modulo operation, and meanwhile the spokes belonging to phase B and phase C of machine unit are symmetrically distributed in space with phase A axis as the central axis;

1.3) the number of spokes in the positive a-phase belt and negative x-phase belt belonging to phase A, the positive b-phase belt and negative y-phase belt belonging to phase B, and the positive c-phase belt and negative z-phase belt belonging to phase C should be divided equally as much as possible, and meanwhile it is necessary to ensure that the number of spokes in the positive sectors is no less than the number of spokes in the negative sectors, in order to complete the design of the initial double-layer asymmetrical winding layout structure.

6. The method for double-layer winding layout of claim 5, wherein the method further comprises the following steps: in step 1.3, the number of spokes in the positive and negative sectors of phase A, phase B and phase C is written as $$\begin{cases} Q_a = 3\left\lceil \dfrac{Q/(3v) - J/9 + \text{mod}(Q/v, 3)}{2} \right\rceil \\[2ex] Q_x = 3\left\lfloor \dfrac{Q/(3v) - J/9 + \text{mod}(Q/v, 3)}{2} \right\rfloor \\[2ex] Q_b = Q_c = 3\left\lceil \dfrac{Q/(3v) - J/9}{2} \right\rceil \\[2ex] Q_y = Q_z = 3\left\lfloor \dfrac{Q/(3v) - J/9}{2} \right\rfloor \end{cases}$$

where $(Q_a, Q_x)$, $(Q_b, Q_y)$ and $(Q_c, Q_z)$ are the number of spokes in positive and negative sectors belonging to phase A, phase B and phase C, respectively;

if one or more of the number of spokes of phase A, phase B and phase C in machine unit cannot be evenly divided, the number of spokes in positive sectors should be greater in quantity than the number of spokes in the negative sectors, that is, the number of spokes $Q_a$ in positive a-phase belt is greater than or equal to the number of spokes $Q_x$ in negative x-phase belt, the number of spokes $Q_b$ in positive b-phase belt is greater than or equal to the number of spokes $Q_y$ in negative y-phase belt, and the number of spokes $Q_c$ in positive c-phase belt is greater than or equal to the number of spokes $Q_z$ in negative z-phase belt.

7. The method for double-layer winding layout of claim 5, wherein the method further comprises the following steps: in step 2, based on the principle of evenly dividing the number of stator slot number, the number of spokes in the positive sector which is labeled as the a-phase belt and the negative sector which is labeled as the x-phase belt belonging to phase A is rearranged, wherein for each machine unit of the asymmetrical winding machine, the specific details are as follows:

in order to make stator slot number equally divided, only all the 2mod (Q/v, 3) spokes from phase A of machine unit should be assigned equally to phase B and phase C, wherein it is necessary to rearrange the number of spokes in positive and negative sectors belonging to phase A of machine unit, wherein with the purpose of maximizing the back-EMF, the three spokes of a-phase belt and x-phase belt closest to y-phase belt and b-phase belt should be assigned to phase B, and the three spokes of a-phase belt and x-phase belt closest to z-phase belt and c-phase belt should be assigned to phase C; according to the parity of the number of spokes of phase A, the number of spokes in positive and negative sectors belonging to phase A is rearranged in order to complete the initial double-layer winding layout structure for secondary construction.

8. The method for double-layer winding layout of claim 5, wherein the method further comprises the following steps: according to the parity of the number of spokes of phase A, the number of spokes in positive and negative sectors belonging to phase A is rearranged, wherein when the k=($Q_a$/3+$Q_x$/3) is even, the slot vectors belonging to a-phase belt and x-phase belt are collinear and their included angle is 180 degrees, wherein the allocation procedures are as follows:

a) when $Q_d/3=1$ and $J/3=1$, the virtual slot number $N_{ax\_L1}$ of the spokes in the positive a-phase belt closest to negative y, z-phase belts and in the negative x-phase belt closest to positive b, c-phase belts can be deduced as $$N_{ax\_L1} = \begin{cases} 1 + \dfrac{(\lambda-1)Q}{v} & \text{(The positive $a$-phase belt closest} \\ & \text{to negative $y, z$-phase belts)} \\ \dfrac{Q_a}{3} + \dfrac{Q_z}{3} + & \text{(The negative $x$-phase belt} \\ \dfrac{Q_b}{3} + 1 + \dfrac{(\lambda-1)Q}{v} & \text{closest to positive $b,c$-phase belts)} \end{cases}$$

wherein $N_{ax\_L1}$ is a virtual slot number of the spokes, and $\lambda$ ($\lambda=1, 2, 3$) is a layer number of the star of slots for each machine unit;

in order to make stator slot number equally divided, it is necessary to take two spokes from the stator vectors whose the virtual slot number is $N_{ax\_L1}$ to assign equally to phase B and phase C, wherein the allocation procedures are as follows:

a1) assign any one spoke from phase A which the virtual slot number is $N_{ax\_L1}$ to b-phase belt or y-phase belt;

a2) based on a1), assign any one spoke from the remaining spokes of phase A which the virtual slot number is $N_{ax\_L1}$ to c-phase belt or z-phase belt;

b) when $Q_d/3=1$ and $J/3\neq1$, the virtual slot number of the spokes in the positive a-phase belt closest to negative y, z-phase belts and in the negative x-phase belt closest to positive b, c-phase belts is same as a), wherein in order to make stator slot number equally divided, it is necessary to take four spokes from the stator vectors whose the virtual slot number is $N_{ax\_L1}$ to assign equally to phase B and phase C, wherein the allocation procedures are as follows:

b1) assign any two spokes from phase A which the virtual slot number is $N_{ax\_L1}$ to b-phase belt or y-phase belt;

b2) based on b1), assign any two spokes from the remaining spokes of phase A which the virtual slot number is $N_{ax\_L1}$ to c-phase belt or z-phase belt;

c) when $Q_d/3\neq1$ and $J/3=1$, the virtual slot number $N_{ax\_L2}$ of the spokes in the positive a-phase belt closest to negative y, z-phase belts, and the virtual slot number $N_{ax\_R2}$ of the spokes in the negative x-phase belt closest to positive b, c-phase belts can be deduced as $$N_{ax\_L2} = \begin{cases} \dfrac{\lambda Q}{v} & \text{(The positive $a$-phase belt closest} \\ & \text{to negative $y$-phase belts)} \\ \dfrac{Q_a}{3} + \dfrac{Q_z}{3} + & \text{(The negative $x$-phase belt} \\ \dfrac{Q_b}{3} + \dfrac{(\lambda-1)Q}{v} & \text{closest to positive $b$-phase belts)} \end{cases}$$

$$N_{ax\_R2} = \begin{cases} \dfrac{Q_a}{3} + \dfrac{(\lambda-1)Q}{v} - 1 & \text{(The positive $a$-phase belt} \\ & \text{closest to negative} \\ & \text{$z$-phase belts)} \\ \dfrac{Q_a}{3} + \dfrac{Q_z}{3} + & \text{(The negative $x$-phase belt} \\ & \text{closest to positive} \\ \dfrac{Q_b}{3} + \dfrac{Q_x}{3} + \dfrac{(\lambda-1)Q}{v} - 1 & \text{$c$-phase belts)} \end{cases}$$

wherein $N_{ax\_L2}$ and $N_{ax\_R2}$ are virtual slot numbers of the spokes, and $\lambda$ ($\lambda=1, 2, 3$) is a layer number of the star of slots for each machine unit;

in order to make stator slot number equally divided, it is necessary to take one spoke respectively from the stator vectors whose the virtual slot number is $N_{ax\_L2}$ and $N_{ax\_R2}$ to assign equally to phase B and phase C, wherein the allocation procedures are as follows:

c1) assign any one spoke from phase A which the virtual slot number is $N_{ax\_L2}$ to b-phase belt or y-phase belt;

c2) based on c1), assign any one spoke from phase A which the virtual slot number is $N_{ax\_R2}$ to z-phase belt or c-phase belt;

d) when $Q_d/3\neq1$ and $J/3\neq1$, the virtual slot number of the spokes in the positive a-phase belt closest to negative y, z-phase belts and in the negative x-phase belt closest to positive b, c-phase belts is same as c);

in order to make stator slot number equally divided, it is necessary to take two spokes respectively from the stator vectors whose the virtual slot number is $N_{ax\_L2}$ and $N_{ax\_R2}$ to assign equally to phase B and phase C, wherein the allocation procedures are as follows:

d1) assign any two spokes from phase A which the virtual slot number is $N_{ax\_L2}$ to b-phase belt or y-phase belt;

d2) based on d1), assign any one spoke from phase A which the virtual slot number is $N_{ax\_R2}$ to z-phase belt or c-phase belt.

9. The method for double-layer winding layout of claim 5, wherein the method further comprises the following steps: according to the parity of the number of spokes of phase A, the number of spokes in positive and negative sectors belonging to phase A is rearranged, wherein when the $k=(Q_d/3+Q_x/3)$ is odd, the slot vectors belonging to a-phase belt and x-phase belt are arranged alternately, and the spokes in the positive a-phase belt are closest to negative y, z-phase belts, wherein the allocation procedures are as follows:

e) when $Q_d/3=1$ and $J/3=1$, the virtual slot number $N_{ax\_L3}$ of the spokes in the positive a-phase belt closest to negative y, z-phase belts can be deduced as $$N_{ax\_L3} = 1 + \frac{(\lambda-1)Q}{v}$$

where the symbol wherein $N_{ax\_L3}$ is a virtual slot number of the spokes, and $\lambda$ ($\lambda=1, 2, 3$) is a layer number of the star of slots for each machine unit;

in order to make stator slot number equally divided, it is necessary to take two spokes from the stator vectors whose the virtual slot number is $N_{ax\_L3}$ to assign equally to phase B and phase C, wherein the allocation procedures are as follows:

e1) assign any one spoke from phase A which the virtual slot number is $N_{ax\_L3}$ to b-phase belt or y-phase belt;

e2) based on e1), assign any one spoke from the remaining spokes of phase A which the virtual slot number is $N_{ax\_L3}$ to c-phase belt or z-phase belt;

f) when $Q_d/3\neq1$ and $J/3=1$, the virtual slot number $N_{ax\_L4}$ of the spokes in the positive a-phase belt closest to negative y-phase belts, and the virtual slot number $N_{ax\_R4}$ of the spokes in the positive a-phase belt closest to negative z-phase belts can be deduced as $$
\begin{cases}
N_{ax\_L4} = \dfrac{\lambda Q}{v} & \text{(The positive } a\text{-phase belt} \\
& \text{closest to negative } y\text{-phase belts)} \\[2ex]
N_{ax\_R4} = \dfrac{Q_a}{3} + & \text{(The positive } a\text{-phase belt} \\
\dfrac{(\lambda-1)Q}{v} - 1 & \text{closest to negative } z\text{-phase belts)}
\end{cases}
$$

5 wherein $N_{ax\_L4}$ and $N_{ax\_R4}$ are virtual slot numbers of the spokes, and $\lambda$ ($\lambda$=1, 2, 3) is a layer number of the star of slots for each machine unit;

10 in order to make stator slot number equally divided, it is necessary to take one spoke respectively from the stator vectors whose the virtual slot number is $N_{ax\_L4}$ and $N_{ax\_R4}$ to assign equally to phase B and phase C, wherein the allocation procedures are as follows:

15 f1) assign any one spoke from phase A which the virtual slot number is $N_{ax\_L4}$ to y-phase belt;

f2) based on f1), assign any one spoke from phase A which the virtual slot number is $N_{ax\_R4}$ to z-phase belt;

g) when $Q_a/3 \neq 1$ and $J/3 \neq 1$, the virtual slot number of the spokes in the positive a-phase belt closest to negative y, z-phase belts is same as f);

in order to make stator slot number equally divided, it is necessary to take two spokes respectively from the stator vectors whose the virtual slot number is $N_{ax\_L4}$ and $N_{ax\_R4}$ to assign equally to phase B and phase C, wherein the allocation procedures are as follows:

g1) assign any two spokes from phase A which the virtual slot number is $N_{ax\_L4}$ to y-phase belt;

g2) based on g1), assign any two spokes from phase A which the virtual slot number is $N_{ax\_R4}$ to z-phase belt; Through rearranging the number of spokes in positive a-phase belt and negative x-phase belt belonging to phase A of machine unit, the stator slot number equally divided is realized.

* * * * *